United States Patent
Kubo et al.

(10) Patent No.: US 11,981,580 B2
(45) Date of Patent: May 14, 2024

(54) METHOD FOR PRODUCING HALIDES

(71) Applicant: Panasonic Intellectual Property Management Co., Ltd., Osaka (JP)

(72) Inventors: Takashi Kubo, Hyogo (JP); Yusuke Nishio, Osaka (JP); Akihiro Sakai, Nara (JP); Akinobu Miyazaki, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 492 days.

(21) Appl. No.: 17/321,481

(22) Filed: May 16, 2021

(65) Prior Publication Data

US 2021/0269324 A1  Sep. 2, 2021

Related U.S. Application Data

(63) Continuation of application No. PCT/JP2019/025440, filed on Jun. 26, 2019.

(30) Foreign Application Priority Data

Dec. 28, 2018  (JP) .................................. 2018-247312

(51) Int. Cl.
*C01F 17/36* (2020.01)
*H01M 10/0562* (2010.01)

(52) U.S. Cl.
CPC .......... *C01F 17/36* (2020.01); *H01M 10/0562* (2013.01); *C01P 2006/40* (2013.01); *H01M 2300/008* (2013.01)

(58) Field of Classification Search
None
See application file for complete search history.

(56) References Cited

U.S. PATENT DOCUMENTS

| | | | |
|---|---|---|---|
| 3,153,570 A | | 10/1964 | Domning |
| 2019/0088995 A1 | | 3/2019 | Asano et al. |

FOREIGN PATENT DOCUMENTS

| | | | |
|---|---|---|---|
| CN | 105254184 | | 1/2016 |
| CN | 106745163 A | * | 5/2017 |
| CN | 107516739 A | * | 12/2017 |
| CN | 106745163 B | | 10/2018 |
| EP | 3496202 A1 | | 6/2019 |
| WO | 2018/025582 | | 2/2018 |

OTHER PUBLICATIONS

English translation of CN 107516739 A Description (Year: 2017).*

(Continued)

*Primary Examiner* — Anthony J Zimmer
*Assistant Examiner* — Zachary John Baum
(74) *Attorney, Agent, or Firm* — Rimon P.C.

(57) ABSTRACT

A method for producing a halide includes heat-treating a mixed material in an inert gas atmosphere, the mixed material being a mixture of $M_2O_3$, $NH_4X$, and LiZ. The M includes at least one element selected from the group consisting of Y, a lanthanoid, and Sc. The X is at least one element selected from the group consisting of Cl, Br, I, and F. The Z is at least one element selected from the group consisting of Cl, Br, I, and F.

18 Claims, 3 Drawing Sheets

(56) References Cited

OTHER PUBLICATIONS

English translation of CN 106745163 A Description (Year: 2017).*
Kowalczyk, E., et al. "Studies on the reaction of ammonium fluoride with lithium carbonate and yttrium oxide." Thermochimica Acta 265 (1995) 189-195. (Year: 1995).*
Meyer, G., et al. Versatility and low-temperature synthetic potential of ammonium halides. Inorg. Chem. 1985, 24, 3504-3505. (Year: 1985).*
International Search Report of PCT application No. PCT/JP2019/025440 dated Sep. 24, 2019.
Andreas Bohnsack et al., "The bromides Li3MBr6 (M=Sm—Lu, Y): Synthesis, Crystal Structure, and Ionic Mobility", Journal of inorganic and General Chemistry, Sep. 1997, vol. 623/Issue 9, pp. 1352-1356.
Ewa Kowalczyk et al., "Studies on the reaction of ammonium fluoride with lithium carbonate and yttrium oxide", Thermochimica Acta, vol. 265, 1995, pp. 189-195.
Andreas Bohnsack et al., "Ternary Chlorides of the Rare-Earth Elements with Lithium, Li3MCl6 (M=Tb—Lu, Y, Sc): Synthesis, Crystal Structures, and Ionic Motion", Journal of inorganic and General Chemistry, Jul. 1997, vol. 623/Issue 7, pp. 1067-1073.
The Extended European Search Report dated Jan. 27, 2022 for the related European Patent Application No. 19904166.6.
"Steiner H-J et al: ""Novel fast ion conductors of the type MI3MIIIC16 (MI=Li, Na, Ag; MIII=In, Y)""", Zeitschrift Fur Anorganische Und Allgemeine Chemie, vol. 613, No. 7, Jul. 1, 1992 (Jul. 1, 1992), pp. 26-30, XP009522283, ISSN: 0044-2313, DOI: 10.1002/ZAAC. 19926130104, Retrieved from the Internet: URL:https://onlinelibrary. wiley.com/doi/10.1002/zaac.19926130104".
International Search Report of PCT application No. PCT/JP2019/025437, dated Sep. 24, 2019.
Meyer, G. "The ammonium chloride route to anhydrous rare earth chlorides—The example of YCl3." in Inorganic Synthesis, vol. 25, 1989. (Year: 1989).
Meyer, G. "GdliCl4, ein inverser Chloroscheelit." Z. anorg. allg. Chem. 511 (1984) 193-200. (Year: 1984) w/English Translation.
The Extended European Search Report dated Jan. 28, 2022 for the related European Patent Application No. 19903989.2.
Non-Final Rejection issued in corresponding U.S. Appl. No. 17/323,920, dated Nov. 30, 2023.

* cited by examiner

METHOD FOR PRODUCING HALIDES

BACKGROUND

1. Technical Field

The present disclosure relates to a method for producing halides.

2. Description of the Related Art

International Publication No. 2018/025582 discloses a method for producing halide solid electrolytes.

SUMMARY

The production of halides using an industrially cost-effective method has been anticipated in the related art.

In one general aspect, the techniques disclosed here feature a method for producing a halide, the method including heat-treating a mixed material in an inert gas atmosphere, the mixed material being a mixture of $M_2O_3$, $NH_4X$, and LiZ. The M includes at least one element selected from the group consisting of Y, a lanthanoid, and Sc. The X is at least one element selected from the group consisting of Cl, Br, I, and F. The Z is at least one element selected from the group consisting of Cl, Br, I, and F.

According to the present disclosure, it may become possible to produce halides by an industrially cost-effective method.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments are described below with reference to the attached drawings.

Embodiment 1

Figure 1:
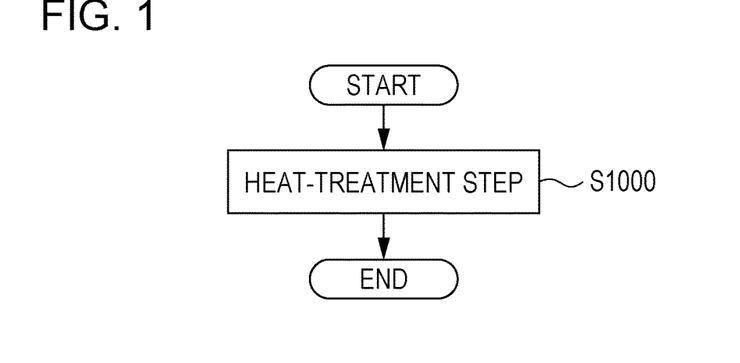
FIG. 1 is a flowchart illustrating an example of a production method according to Embodiment 1.

FIG. 1 is a flowchart illustrating an example of a production method according to Embodiment 1.

The production method according to Embodiment 1 includes a heat-treatment step S1000.

The heat-treatment step S1000 is a step of heat-treating a mixed material in an inert gas atmosphere.

The mixed material that is to be heat-treated in the heat-treatment step S1000 is a mixture of $M_2O_3$, $NH_4X$, and LiZ.

M includes at least one element selected from the group consisting of Y (i.e., yttrium), a lanthanoid (i.e., at least one element selected from the group consisting of La, Ce, Pr, Nd, Pm, Sm, Eu, Gd, Tb, Dy, Ho, Er, Tm, Yb, and Lu), and Sc (i.e., scandium).

X is at least one element selected from the group consisting of Cl, Br, I, and F.

Z is at least one element selected from the group consisting of Cl, Br, I, and F.

This makes it possible to produce halides by an industrially cost-effective method (e.g., a method that allows mass production at low costs). Specifically, it may become possible to produce halides including Li (i.e., lithium) and M by an easy and simple method (i.e., performing heat-treatment in an inert gas atmosphere) without performing vacuum tube sealing or using a planetary ball mill. This also makes it possible to synthesize halides from inexpensive $M_2O_3$ and $NH_4X$ in an easy and simple manner and consequently may further reduce the manufacturing costs.

In the present disclosure, M may be at least one element selected from the group consisting of Y, Sm, and Gd.

In such a case, a halide having a further high ionic conductivity may be produced.

In the present disclosure, X may be at least one element selected from the group consisting of Cl, Br, and I, and Z may be at least one element selected from the group consisting of Cl, Br, and I.

In such a case, a halide having a further high ionic conductivity may be produced.

For example, in the case where $Li_3MX_6$ is prepared from $M_2O_3$, $NH_4X$, and LiX (i.e., a compound represented by LiZ where Z is X), the reaction represented by Formula (1) is considered to occur as a whole system.

$$M_2O_3 + 12NH_4X + 6LiX \rightarrow 2Li_3MX_6 + 12NH_3 + 6HX + 3H_2O \quad (1)$$

In the heat-treatment step S1000, for example, a powder of the mixed material may be heat-treated in a heating furnace while the powder is charged in a container (e.g., a crucible). In this step, a situation where the mixed material has been heated to a predetermined temperature in an inert gas atmosphere may be maintained for a time period of greater than or equal to a predetermined amount of time. The amount of heat-treatment time may be set such that the composition of the heat-treated product does not change due to the volatilization of halides or the like (i.e., such that the ionic conductivity of the heat-treated product is not impaired).

Examples of the inert gas include helium, nitrogen, and argon.

Subsequent to the heat-treatment step S1000, the heat-treated product may be removed from the container (e.g., a crucible) and pulverized. In such a case, the heat-treated product may be pulverized with a pulverizer (e.g., a mortar or a mixer).

In the present disclosure, the mixed material may be a mixture of a "material represented by $M_2O_3$ where M is partially replaced with an "other cation" (i.e., a cation other than Y, a lanthanoid, or Sc)", $NH_4X$, and LiZ. In such a case, the properties (e.g., ionic conductivity) of the halide produced by the production method according to the present disclosure may be improved. The proportion at which M is replaced with the "other cation" may be less than 50 mol %. This enables the production of a halide having a further stable structure.

In the present disclosure, the mixed material may be a mixture of only the three materials, that is, $M_2O_3$, $NH_4X$, and LiZ. In the present disclosure, alternatively, the mixed material may be a mixture further including a material other than $M_2O_3$, $NH_4X$, or LiZ, in addition to $M_2O_3$, $NH_4X$, and LiZ.

In the heat-treatment step S1000, the mixed material may be heat-treated at a temperature of greater than or equal to 200° C. and less than or equal to 650° C.

In such a case, setting the heat-treatment temperature to be greater than or equal to 200° C. enables $M_2O_3$, $NH_4X$, and LiZ to react with one another. Moreover, setting the heat-treatment temperature to be less than or equal to 650° C. may suppress the pyrolysis of the halide produced by the solid-phase reaction.

In Formula (1) above, first, $M_2O_3$ may be halogenated by the reaction between $M_2O_3$ and $NH_4X$. A heat-treatment profile may be set such that the halogenated $M_2O_3$ reacts with LiX subsequently. In such a case, a temperature which is lower than the sublimation point (or, melting point) of $NH_4X$ and at which the reaction between the halogenated $M_2O_3$ and LiX occurs (i.e., a temperature at which the halide solid electrolyte $Li_3MX_6$ can be produced) may be selected as a heat-treatment temperature.

For example, in the case where $Li_3YBr_3Cl_3$ is synthesized from $Y_2O_3$, $NH_4Cl$, and LiBr, the reaction represented by Formula (2) below is considered to occur.

$$Y_2O_3+12NH_4Cl+6LiBr \rightarrow 2Li_3YBr_3Cl_3+12NH_3+ 3HBr+3HCl+3H_2O \quad (2)$$

For example, the heat-treatment temperature in this reaction may be set to about 300° C. (i.e., a temperature which is lower than the sublimation point (i.e., 335° C.) of $NH_4Cl$ and at which $Li_3YBr_3Cl_3$ can be produced). Heat-treatment may be performed at a temperature higher than 300° C. in order to produce a halide having a further high ionic conductivity. In such a case, as described in Embodiment 2 below, the heat-treatment step may be conducted in at least two or more stages and the heat-treatment temperatures in the second and subsequent stages of the heat-treatment step may be increased while the heat-treatment temperature in the first stage of the heat-treatment step is set to be lower than the sublimation point of $NH_4X$.

In the heat-treatment step S1000, the mixed material may be heat-treated for a time period of greater than or equal to 1 hour and less than or equal to 72 hours.

In such a case, a halide having a further high ionic conductivity may be produced by an industrially cost-effective method. Specifically, setting the heat-treatment time to be greater than or equal to 1 hour enables the reaction between $M_2O_3$, $NH_4X$, and LiZ to occur to a sufficient degree. Setting the heat-treatment time to be less than or equal to 72 hours may reduce the volatilization of the halide produced by heat-treatment and enables the production of a halide containing constituent elements at an intended compositional ratio (i.e., change in composition may be reduced). This may further increase the ionic conductivity of the halide produced by heat-treatment. That is, for example, a halide solid electrolyte having further high quality may be produced.

Figure 2:
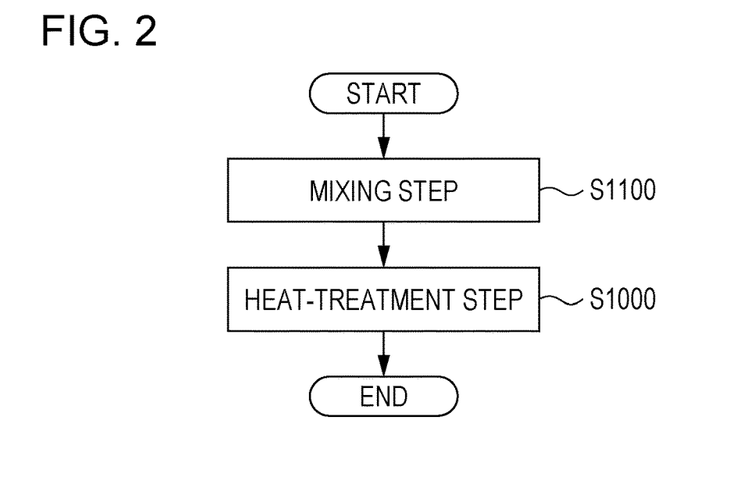
FIG. 2 is a flowchart illustrating another example of the production method according to Embodiment 1.

FIG. 2 is a flowchart illustrating an example of the production method according to Embodiment 1.

As illustrated in FIG. 2, the production method according to Embodiment 1 may further include a mixing step S1100.

The mixing step S1100 is a step conducted prior to the heat-treatment step S1000.

The mixing step S1100 is a step in which $M_2O_3$, $NH_4X$, and LiZ used as raw materials are mixed with one another to form a mixed material (i.e., the material that is to be heat-treated in the heat-treatment step S1000).

For mixing the raw materials, commonly known mixers (e.g., a mortar, a blender, and a ball mill) may be used. For example, in the mixing step S1100, each of the raw materials may be prepared in a powder form and the powders of the raw materials may be mixed with one another. In such a case, in the heat-treatment step S1000, the powdery mixed material may be heat-treated. The powdery mixed material prepared in the mixing step S1100 may be formed into pellets by uniaxial pressing. In such a case, in the heat-treatment step S1000, the pellet-form mixed material may be heat-treated to produce the halide.

In the mixing step S1100, a raw material other than $M_2O_3$, $NH_4X$, or LiZ may be mixed with $M_2O_3$, $NH_4X$, and LiZ to prepare the mixed material.

In the mixing step S1100, the mixed material may be prepared by mixing a "raw material including $M_2O_3$ as a principal component", a "raw material including $NH_4X$ as a principal component", and a "raw material including LiZ as a principal component" with one another.

In the mixing step S1100, the molar mixing ratio between $M_2O_3$, $NH_4X$, and LiZ may be adjusted by weighing $M_2O_3$, $NH_4X$, and LiZ such that they are mixed at an intended molar ratio.

For example, $Y_2O_3$, $NH_4Cl$, and LiCl may be mixed with one another at a molar ratio of $Y_2O_3:NR_4Cl:LiCl=1:12:6$. In such a case, a compound having a composition of $Li_3YCl_6$ may be produced.

In consideration of the change in composition which may occur in the heat-treatment step S1000, the mixing ratio between $M_2O_3$, $NH_4X$, and LiZ may be adjusted in advance such that the change in composition can be canceled out.

The amount of $NH_4X$ mixed with $M_2O_3$ may be set to be excessively large relative to the amount of $M_2O_3$ in order to conduct the synthesis reaction in the heat-treatment step S1000 in a stable manner. For example, the amount of the $NH_4X$ mixed with $M_2O_3$ may be excessively large relative to the amount of $M_2O_3$ so as to be larger by 5 to 15 mol % than a predetermined amount based on the stoichiometric ratio.

Figure 3:
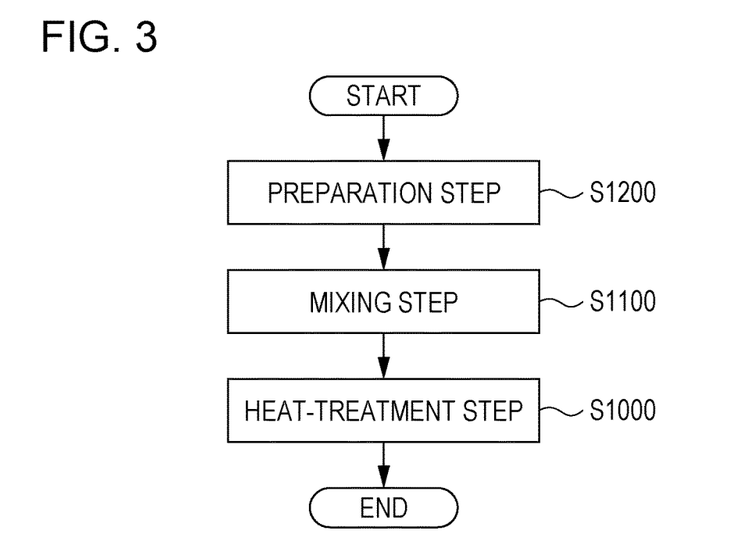
FIG. 3 is a flowchart illustrating another example of the production method according to Embodiment 1.

FIG. 3 is a flowchart illustrating an example of the production method according to Embodiment 1.

As illustrated in FIG. 3, the production method according to Embodiment 1 may further include a preparation step S1200.

The preparation step S1200 is a step conducted prior to the mixing step S1100.

The preparation step S1200 is a step in which the raw materials (i.e., the materials to be mixed with one another in the mixing step S1100), such as $M_2O_3$, $NH_4X$, and LiZ, are prepared.

In the preparation step S1200, the raw materials, such as $M_2O_3$, $NH_4X$, and LiZ, may be prepared by material synthesis. In the preparation step S1200, alternatively, commonly known commercial materials (e.g., materials having a purity of greater than or equal to 99%) may be used. The raw materials may be dried materials. The raw materials may be in the form of crystals, blocks, flakes, a powder, or the like. In the preparation step S1200, powdery raw materials may be prepared by pulverizing crystalline, blocked, or flaky raw materials.

The halide produced by the production method according to the present disclosure may be used as a solid-electrolyte material. In such a case, the solid-electrolyte material may be, for example, a solid electrolyte conductive to lithium ions. Such a solid-electrolyte material may be used as, for example, a solid-electrolyte material included in solid-state lithium secondary batteries.

Embodiment 2

Embodiment 2 is described below. Descriptions that duplicate those of Embodiment 1 above are omitted appropriately.

Figure 4:
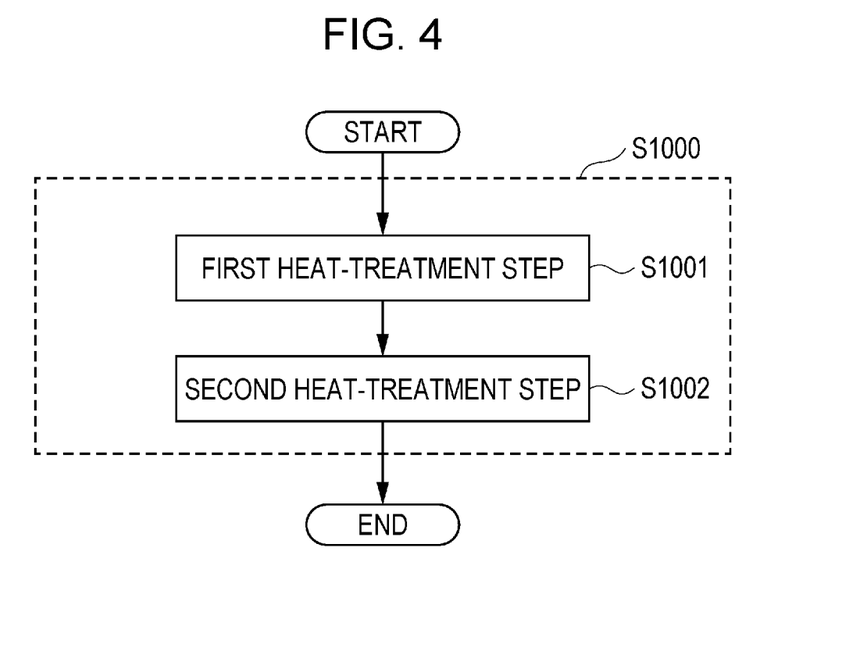
FIG. 4 is a flowchart illustrating an example of a production method according to Embodiment 2.

FIG. 4 is a flowchart illustrating an example of a production method according to Embodiment 2.

The production method according to Embodiment 2 has the following features in addition to the features of the production method according to Embodiment 1.

Specifically, in the production method according to Embodiment 2, the heat-treatment step S1000 includes a first heat-treatment step S1001 and a second heat-treatment step S1002.

The second heat-treatment step S1002 is a step conducted subsequent to the first heat-treatment step S1001.

In the first heat-treatment step S1001, the mixed material is heat-treated at a first heat-treatment temperature T1.

In the second heat-treatment step S1002, the mixed material is heat-treated at a second heat-treatment temperature T2.

Furthermore, T1≤T2 is satisfied.

This enables a halide having a further high ionic conductivity to be produced by an industrially cost-effective method. Specifically, causing $M_2O_3$ and $NH_4X$ to react with each other (i.e., halogenating $M_2O_3$) at the first heat-treatment temperature T1 and subsequently heat-treating the halogenated $M_2O_3$ and LiZ at a further high temperature, that is, the second heat-treatment temperature T2, may further enhance the crystallinity of the halide produced by heat-treatment. This may increase the ionic conductivity of the halide produced by heat-treatment. That is, for example, a halide solid electrolyte having high quality may be produced.

In the production method according to Embodiment 2, in the case where the X includes Cl (e.g., in the case where $NH_4X$ is $NR_4Cl$), 200° C. T1≤330° C. may be satisfied.

In such a case, a halide having a further high ionic conductivity may be produced by an industrially cost-effective method. Specifically, setting the first heat-treatment temperature T1 to be greater than or equal to 200° C. enables the reaction between $M_2O_3$ and $NH_4X$ to occur to a sufficient degree. Furthermore, setting the first heat-treatment temperature T1 to be less than 330° C. may suppress the sublimation of $NH_4X$ (e.g., the sublimation point of $NH_4Cl$ is 335° C.). This may increase the ionic conductivity of the halide produced by heat-treatment. That is, for example, a halide solid electrolyte having high quality may be produced.

In the production method according to Embodiment 2, in the case where the X includes Cl (e.g., in the case where $NH_4X$ is $NR_4Cl$), 330° C. T2 650° C. may be satisfied.

In such a case, a halide having a further high ionic conductivity may be produced by an industrially cost-effective method. Specifically, setting the second heat-treatment temperature T2 to be greater than or equal to 330° C. enables the reaction between "the product of reaction between $M_2O_3$ and $NH_4X$" and LiZ to occur to a sufficient degree. This may further enhance the crystallinity of the halide produced by heat-treatment. Furthermore, setting the second heat-treatment temperature T2 to be less than or equal to 650° C. may suppress the pyrolysis of the halide produced by the solid-phase reaction. This may increase the ionic conductivity of the halide produced by heat-treatment. That is, for example, a halide solid electrolyte having high quality may be produced.

In the production method according to Embodiment 2, in the case where the X includes Br (e.g., in the case where $NH_4X$ is $NH_4Br$), 200° C. T1≤390° C. may be satisfied.

In such a case, a halide having a further high ionic conductivity may be produced by an industrially cost-effective method. Specifically, setting the first heat-treatment temperature T1 to be greater than or equal to 200° C. enables the reaction between $M_2O_3$ and $NH_4X$ to occur to a sufficient degree. Furthermore, setting the first heat-treatment temperature T1 to be less than 390° C. may suppress the sublimation of $NH_4X$ (e.g., the sublimation point of $NH_4Br$ is 396° C.). This may increase the ionic conductivity of the halide produced by heat-treatment. That is, for example, a halide solid electrolyte having high quality may be produced.

In the production method according to Embodiment 2, in the case where the X includes Br (e.g., in the case where $NH_4X$ is $NH_4Br$), 390° C. T2 650° C. may be satisfied.

In such a case, a halide having a further high ionic conductivity may be produced by an industrially cost-effective method. Specifically, setting the second heat-treatment temperature T2 to be greater than or equal to 390° C. enables the reaction between "the product of reaction between $M_2O_3$ and $NH_4X$" and LiZ to occur to a sufficient degree. This may further enhance the crystallinity of the halide produced by heat-treatment. Furthermore, setting the second heat-treatment temperature T2 to be less than or equal to 650° C. may suppress the pyrolysis of the halide produced by the solid-phase reaction. This may increase the ionic conductivity of the halide produced by heat-treatment. That is, for example, a halide solid electrolyte having high quality may be produced.

In the production method according to Embodiment 2, in the case where the X includes I (e.g., in the case where $NH_4X$ is $NH_4I$), 200° C. T1≤550° C. may be satisfied.

In such a case, a halide having a further high ionic conductivity may be produced by an industrially cost-effective method. Specifically, setting the first heat-treatment temperature T1 to be greater than or equal to 200° C. enables the reaction between $M_2O_3$ and $NH_4X$ to occur to a sufficient degree. Furthermore, setting the first heat-treatment temperature T1 to be less than 550° C. may suppress the sublimation of $NH_4X$ (e.g., the sublimation point of $NH_4I$ is 551° C.). This may increase the ionic conductivity of the halide produced by heat-treatment. That is, for example, a halide solid electrolyte having high quality may be produced.

In the production method according to Embodiment 2, in the case where the X includes I (e.g., in the case where $NH_4X$ is $NH_4I$), 550° C. T2 650° C. may be satisfied.

In such a case, a halide having a further high ionic conductivity may be produced by an industrially cost-effective method. Specifically, setting the second heat-treatment temperature T2 to be greater than or equal to 550° C. enables the reaction between "the product of reaction between $M_2O_3$ and $NH_4X$" and LiZ to occur to a sufficient degree. This may further enhance the crystallinity of the halide produced by heat-treatment. Furthermore, setting the second heat-treatment temperature T2 to be less than or equal to 650° C. may suppress the pyrolysis of the halide produced by the solid-phase reaction. This may increase the ionic conductivity of the halide produced by heat-treatment. That is, for example, a halide solid electrolyte having high quality may be produced.

In the production method according to Embodiment 2, in the case where the X includes F (e.g., in the case where $NH_4X$ is $NH_4F$), 200° C. T1≤230° C. may be satisfied.

In such a case, a halide having a further high ionic conductivity may be produced by an industrially cost-effective method. Specifically, setting the first heat-treatment temperature T1 to be greater than or equal to 200° C. enables the reaction between $M_2O_3$ and $NH_4X$ to occur to a sufficient degree. Furthermore, setting the first heat-treatment temperature T1 to be less than 230° C. may suppress the sublimation of $NH_4X$ (e.g., the sublimation point of $NH_4F$ is 238° C.). This may increase the ionic conductivity of the halide produced by heat-treatment. That is, for example, a halide solid electrolyte having high quality may be produced.

In the production method according to Embodiment 2, in the case where the X includes F (e.g., in the case where NH$_4$X is NH$_4$F), 230° C. T2 650° C. may be satisfied.

In such a case, a halide having a further high ionic conductivity may be produced by an industrially cost-effective method. Specifically, setting the second heat-treatment temperature T2 to be greater than or equal to 230° C. enables the reaction between "the product of reaction between M$_2$O$_3$ and NH$_4$X" and LiZ to occur to a sufficient degree. This may further enhance the crystallinity of the halide produced by heat-treatment. Furthermore, setting the second heat-treatment temperature T2 to be less than or equal to 650° C. may suppress the pyrolysis of the halide produced by the solid-phase reaction. This may increase the ionic conductivity of the halide produced by heat-treatment. That is, for example, a halide solid electrolyte having high quality may be produced.

Figure 5:
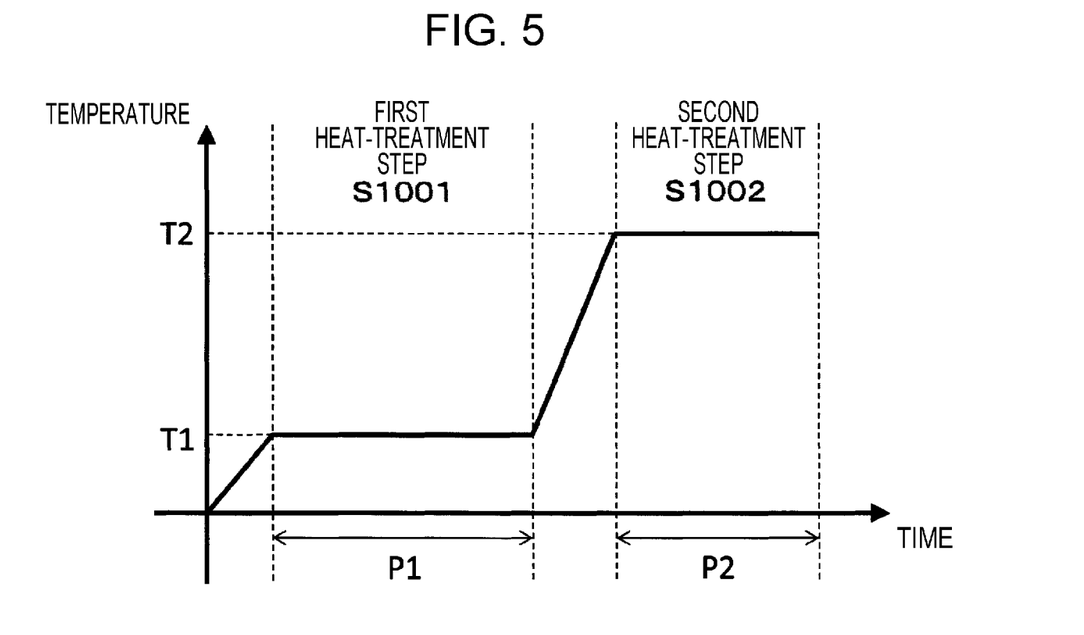
FIG. 5 is a diagram illustrating an example of the profile of heat-treatment temperature in the production method according to Embodiment 2.

FIG. 5 is a diagram illustrating an example of the profile of heat-treatment temperature in the production method according to Embodiment 2.

As illustrated in FIG. 5, in the first heat-treatment step S1001, the mixed material may be heat-treated for a first heat-treatment time P1.

Furthermore, in the second heat-treatment step S1002, the mixed material may be heat-treated for a second heat-treatment time P2.

Moreover, P1≥P2 may be satisfied.

In such a case, a halide having a further high ionic conductivity may be produced by an industrially cost-effective method. Specifically, the reaction between M$_2$O$_3$ and NH$_4$X may occur to a sufficient degree (i.e., M$_2$O$_3$ may be halogenated to a sufficient degree) at the first heat-treatment temperature T1 for a larger amount of time, that is, the first heat-treatment time P1. Furthermore, heat-treating the sufficiently halogenated M$_2$O$_3$ and LiZ at a higher temperature, that is, the second heat-treatment temperature T2, for the second heat-treatment time P2 may further enhance the crystallinity of the halide produced by heat-treatment. This may increase the ionic conductivity of the halide produced by heat-treatment. That is, for example, a halide solid electrolyte having high quality may be produced.

The first heat-treatment time P1 may be greater than or equal to 1 hour and less than or equal to 72 hours.

In such a case, a halide having a further high ionic conductivity may be produced by an industrially cost-effective method. Specifically, setting the first heat-treatment time P1 to be greater than or equal to 1 hour enables the reaction between M$_2$O$_3$ and NH$_4$X to occur to a sufficient degree. Moreover, setting the first heat-treatment time P1 to be less than or equal to 72 hours may reduce the volatilization of the "product of the reaction between M$_2$O$_3$ and NH$_4$X" and enables the production of a halide containing constituent elements at an intended compositional ratio (i.e., change in composition may be reduced). This may further increase the ionic conductivity of the halide produced by heat-treatment. That is, for example, a halide solid electrolyte having further high quality may be produced.

The second heat-treatment time P2 may be greater than or equal to 1 hour and less than or equal to 72 hours.

In such a case, a halide having a further high ionic conductivity may be produced by an industrially cost-effective method. Specifically, setting the second heat-treatment time P2 to be greater than or equal to 1 hour enables the reaction between the "product of the reaction between M$_2$O$_3$ and NH$_4$X" and LiZ to occur to a sufficient degree. Moreover, setting the second heat-treatment time P2 to be less than or equal to 72 hours may reduce the volatilization of the halide produced by heat-treatment and enables the production of a halide containing constituent elements at an intended compositional ratio (i.e., change in composition may be reduced). This may further increase the ionic conductivity of the halide produced by heat-treatment. That is, for example, a halide solid electrolyte having further high quality may be produced.

In the first heat-treatment step S1001, (NH$_4$)aMX$_{3+a}$ (0≤a≤3) may be synthesized by the reaction between M$_2$O$_3$ and NH$_4$X. In the second heat-treatment step S1002, a halide (i.e., a solid electrolyte) may be synthesized by the reaction between the (NH$_4$)aMX$_{3+a}$ produced in the first heat-treatment step S1001 and LiZ.

For example, a case where the heat-treatment temperatures T1 and T2 in the synthesis of Li$_3$YBr$_3$Cl$_3$ from Y$_2$O$_3$, NR$_4$Cl, and LiBr are set to about 200° C. and about 500° C., respectively, is discussed below. In this case, in the first heat-treatment step S1001, NH$_4$Cl reacts with Y$_2$O$_3$ to primarily form (NH$_4$)aMX$_{3+a}$ (0≤a≤3), without being sublimated. Subsequently, in the second heat-treatment step S1002, when the temperature is increased to 500° C., (NH$_4$)aMX$_{3+a}$ reacts with LiCl to produce a halide solid electrolyte having suitable crystallinity. A halide solid electrolyte having a high ionic conductivity may be produced in the above-described manner.

In the present disclosure, the heat-treatment step S1000 may further include a heat-treatment step other than the first heat-treatment step S1001 or the second heat-treatment step S1002. That is, the heat-treatment step may include three or more steps depending on the types of the raw materials used (or, the number of the raw materials used).

EXAMPLES

Details of the present disclosure are described with reference to Examples and Comparative examples below, which are intended to be illustrative and not restrictive of the present disclosure.

In Examples below, the halides prepared by the production method according to the present disclosure were produced and evaluated as a solid-electrolyte material.

Example 1

Preparation of Solid-Electrolyte Material

Y$_2$O$_3$, NH$_4$Cl, and LiBr were weighed such that the molar ratio between Y$_2$O$_3$, NH$_4$Cl, and LiBr was Y$_2$O$_3$:NR$_4$Cl: LiBr=1:13.2:6 (i.e., weighed such that the amount of NH$_4$Cl was excessively large relative to the amount of Y$_2$O$_3$ so as to be larger by 10 mol % than a predetermined amount) in an argon atmosphere having a dew point of less than or equal to −60° C. The above materials were pulverized and mixed with one another in an agate mortar. The resulting mixture was charged into an alumina crucible and held for 15 hours in a nitrogen atmosphere at T1=T2=300° C.

After heat-treatment had been finished, pulverization was performed with an agate mortar. Hereby, a solid-electrolyte material of Example 1 was prepared.

Evaluation of Ionic Conductivity

Figure 6:
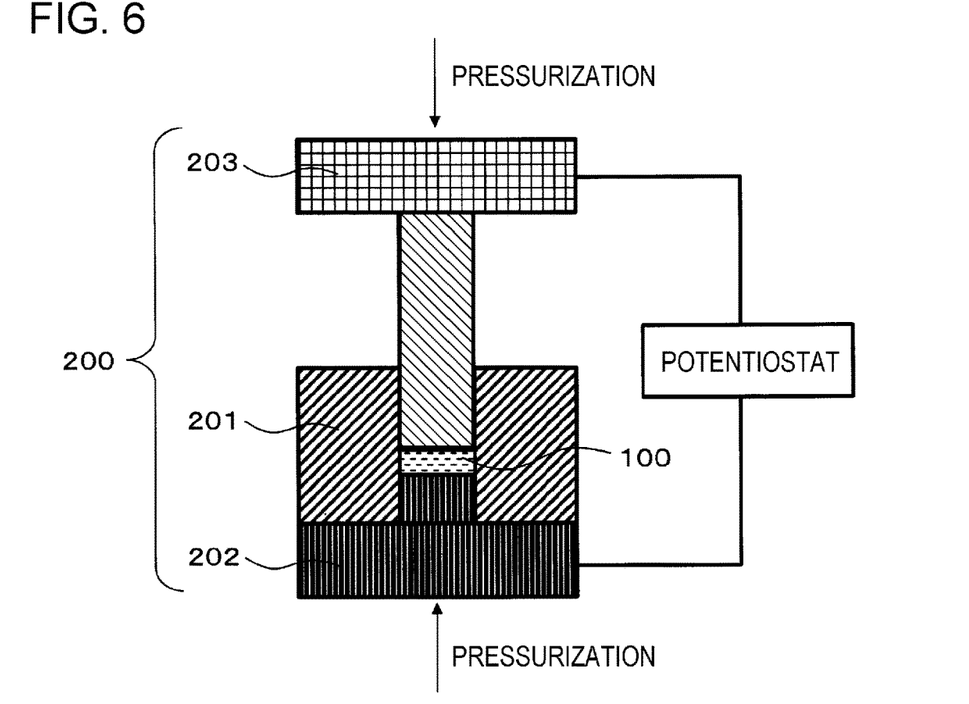
FIG. 6 is a schematic diagram illustrating a method for evaluating ionic conductivity.

FIG. 6 is a schematic diagram illustrating a method for evaluating ionic conductivity.

A pressure molding die 200 is constituted by an electronically insulating die 201 made of polycarbonate and electronically conductive punch upper and lower portions 203 and 202 made of stainless steel.

Ionic conductivity was evaluated by the following method using the structure illustrated in FIG. 6.

In a dry atmosphere having a dew point of less than or equal to −60° C., a solid-electrolyte powder 100 that was a powder of the solid-electrolyte material prepared in Example 1 was charged into the pressure molding die 200 and uniaxially pressed at 300 MPa. Hereby, a conductivity measurement cell of Example 1 was prepared.

While pressurization was done, each of the punch upper portion 203 and the punch lower portion 202 was connected to a potentiostat ("VersaSTAT 4" produced by Princeton Applied Research) including a frequency response analyzer with a wire. Subsequently, ionic conductivity at room temperature was measured by an electrochemical impedance measurement method.

Figure 7:
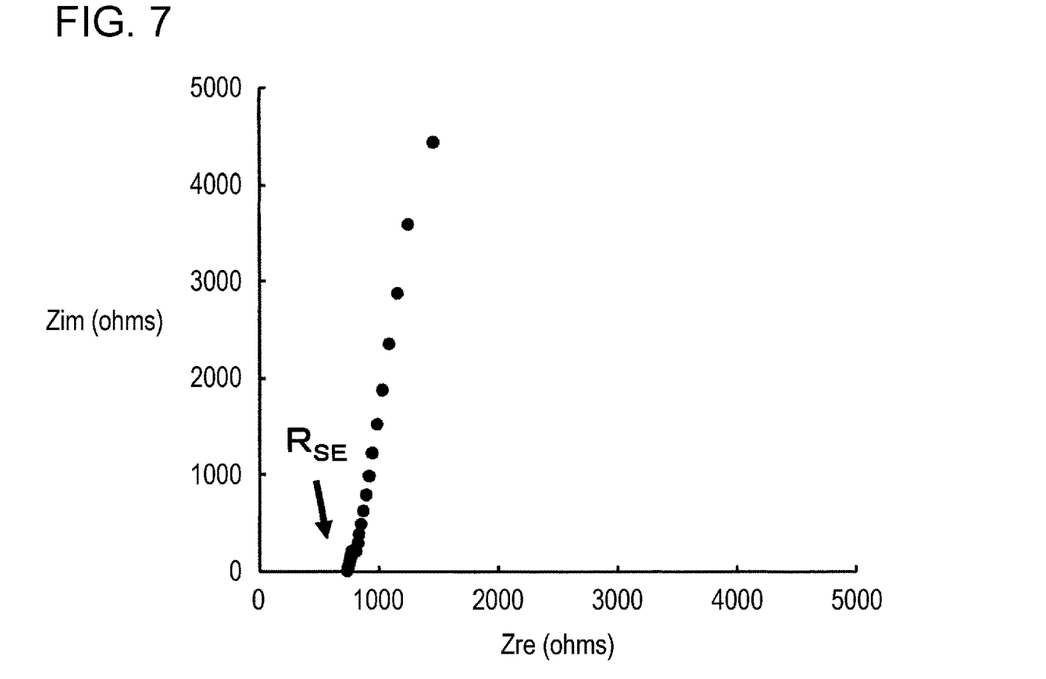
FIG. 7 is a graph illustrating the results of evaluation of ionic conductivity which was made by measuring AC impedance.

FIG. 7 is a graph illustrating the results of evaluation of ionic conductivity which was made by measuring AC impedance. FIG. 7 illustrates the Cole-Cole plot of the results of the measurement of impedance.

In FIG. 7, the real part of the impedance at the measurement point (the arrow in FIG. 7) at which the absolute value of phase of complex impedance was minimum was considered the resistance of the solid electrolyte prepared in Example 1 to ionic conduction. Ionic conductivity was calculated by Formula (3) below, using the resistance of the electrolyte.

$$\sigma = (R_{SE} \times S/t)^{-1} \quad (3)$$

where σ is ionic conductivity, S is the area of the electrolyte (in FIG. 6, the inside diameter of the die 201), $R_{SE}$ is the resistance of the solid electrolyte measured in the above impedance measurement, and t is the thickness of the electrolyte (in FIG. 6, the thickness of the solid-electrolyte powder 100).

The ionic conductivity of the solid-electrolyte material prepared in Example 1 which was measured at 22° C. was $8.6 \times 10^{-5}$ S/cm.

Example 2

Preparation of Solid-Electrolyte Material $Y_2O_3$, $NH_4Cl$, and LiBr were weighed such that the molar ratio between $Y_2O_3$, $NH_4Cl$, and LiBr was $Y_2O_3:NR_4Cl:LiBr=1:13.2:6$ (i.e., weighed such that the amount of $NH_4Cl$ was excessively large relative to the amount of $Y_2O_3$ so as to be larger by 10 mol % than a predetermined amount based on the stoichiometric ratio) in an argon atmosphere having a dew point of less than or equal to -60° C. The above materials were pulverized and mixed with one another in an agate mortar. The resulting mixture was charged into an alumina crucible and held for 15 hours in a nitrogen atmosphere at T1=200° C. Subsequently, the temperature was set to T2=500° C. and then holding was performed for 1 hour in a nitrogen atmosphere.

After heat-treatment had been finished, pulverization was performed with an agate mortar. Hereby, a solid-electrolyte material of Example 2 was prepared. Evaluation of Ionic Conductivity The conductivity measurement cell of Example 2 was prepared and subjected to the measurement of ionic conductivity as in Example 1.

Examples 3 to 5

Preparation of Solid-Electrolyte Material

In Examples 3 to 5, raw-material powders were weighed in an argon atmosphere having a dew point of less than or equal to -60° C.

In Example 3, $Y_2O_3$, $NH_4Cl$, and LiCl were weighed such that the molar ratio between $Y_2O_3$, $NH_4Cl$, and LiCl was $Y_2O_3:NH_4Cl:LiCl=1:13.2:6$.

In Example 4, $Y_2O_3$, $NH_4Br$, and LiCl were weighed such that the molar ratio between $Y_2O_3$, $NH_4Br$, and LiCl was $Y_2O_3:NH_4Br:LiCl=1:13.2:6$.

In Example 5, $Y_2O_3$, $NH_4Br$, and LiBr were weighed such that the molar ratio between $Y_2O_3$, $NH_4Br$, and LiBr was $Y_2O_3:NH_4Br:LiBr=1:13.2:6$.

The resulting mixtures were charged into alumina crucibles and held for 15 hours in a nitrogen atmosphere at T1=200° C. Subsequently, the temperature was set to T2=500° C. and then holding was performed for 1 hour in a nitrogen atmosphere.

After heat-treatment had been finished, pulverization was performed with an agate mortar. Hereby, solid-electrolyte materials of Examples 3 to 5 were prepared.

Evaluation of Ionic Conductivity

The conductivity measurement cells of Examples 3 to 5 were prepared and subjected to the measurement of ionic conductivity as in Example 1.

Examples 6 to 8

Preparation of Solid-Electrolyte Material

In Examples 6 to 8, raw-material powders were weighed in an argon atmosphere having a dew point of less than or equal to -60° C.

In Example 6, $Sm_2O_3$, $NH_4Br$, and LiI were weighed such that the molar ratio between $Sm_2O_3$, $NH_4Br$, and LiI was $Sm_2O_3:NH_4Br:LiI=1:13.2:6$.

In Example 7, $Gd_2O_3$, $NH_4Br$, and LiCl were weighed such that the molar ratio between $Gd_2O_3$, $NH_4Br$, and LiCl was $Gd_2O_3:NH_4Br:LiCl=1:13.2:6$.

In Example 8, $Gd_2O_3$, $NH_4Br$, and LiBr were weighed such that the molar ratio between $Gd_2O_3$, $NH_4Br$, and LiBr was $Gd_2O_3:NH_4Br:LiBr=1:13.2:6$.

The resulting mixtures were charged into alumina crucibles and held for 15 hours in a nitrogen atmosphere at T1=200° C. Subsequently, the temperature was set to T2=500° C. and then holding was performed for 1 hour in a nitrogen atmosphere.

After heat-treatment had been finished, pulverization was performed with an agate mortar. Hereby, solid-electrolyte materials of Examples 6 to 8 were prepared.

Evaluation of Ionic Conductivity

The conductivity measurement cells of Examples 6 to 8 were prepared and subjected to the measurement of ionic conductivity as in Example 1. Examples 9 and 10 Preparation of Solid-Electrolyte Material $Y_2O_3$, $NR_4Cl$, and LiBr were weighed such that the molar ratio between $Y_2O_3$, $NH_4Cl$, and LiBr was $Y_2O_3:NR_4Cl:LiBr=1:13.2:6$ in an argon atmosphere having a dew point of less than or equal to -60° C. The above materials were pulverized and mixed with one another in an agate mortar.

In Example 9, the resulting mixture was charged into an alumina crucible and held for 15 hours in a nitrogen atmosphere at T1=T2=200° C.

In Example 10, the resulting mixture was charged into an alumina crucible and held for 15 hours in a nitrogen atmosphere at T1=T2=500° C.

After heat-treatment had been finished, pulverization was performed with an agate mortar. Hereby, solid-electrolyte materials of Examples 9 and 10 were prepared.

Evaluation of Ionic Conductivity

The conductivity measurement cells of Examples 9 and 10 were prepared and subjected to the measurement of ionic conductivity as in Example 1. Table 1 describes the structures and evaluation results of Examples 1 to 10.

TABLE 1

| | Raw material 1 $M_2O_3$ | Raw material 2 $NH_4X$ | Raw material 3 LiZ | Molar mixing ratio Raw materials 1:2:3 | Solid phase synthesis (heat-treatment temperature) | | Solid electrolyte Li-M-XZ | ionic conductivity (S/cm) |
|---|---|---|---|---|---|---|---|---|
| | | | | | T1 (°C.) | T2 (°C.) | | |
| Example 1 | $Y_2O_3$ | $NH_4Cl$ | LiBr | 1:13.2:6 | 300 | 300 | Li-Y-Br-Cl | $8.6 \times 10^{-5}$ |
| Example 2 | $Y_2O_3$ | $NH_4Cl$ | LiBr | 1:13.2:6 | 200 | 500 | Li-Y-Br-Cl | $2.1 \times 10^{-3}$ |
| Example 3 | $Y_2O_3$ | $NH_4Cl$ | LiCl | 1:13.2:6 | 200 | 500 | Li-Y-Cl | $2.9 \times 10^{-4}$ |
| Example 4 | $Y_2O_3$ | $NH_4Br$ | LiCl | 1:13.2:6 | 200 | 500 | Li-Y-Br-Cl | $1.8 \times 10^{-3}$ |
| Example 5 | $Y_2O_3$ | $NH_4Br$ | LiBr | 1:13.2:6 | 200 | 500 | Li-Y-Br | $2.8 \times 10^{-4}$ |
| Example 6 | $Sm_2O_3$ | $NH_4Br$ | LiI | 1:13.2:6 | 200 | 500 | Li-Sm-Br-I | $2.1 \times 10^{-4}$ |
| Example 7 | $Gd_2O_3$ | $NH_4Br$ | LiCl | 1:13.2:6 | 200 | 500 | Li-Gd-Br-Cl | $2.1 \times 10^{-3}$ |
| Example 8 | $Gd_2O_3$ | $NH_4Br$ | LiBr | 1:13.2:6 | 200 | 500 | Li-Gd-Br | $4.2 \times 10^{-3}$ |
| Example 9 | $Y_2O_3$ | $NH_4Cl$ | LiBr | 1:13.2:6 | 200 | 200 | Li-Y-Br-Cl | $9.6 \times 10^{-7}$ |
| Example 10 | $Y_2O_3$ | $NH_4Cl$ | LiBr | 1:13.2:6 | 500 | 500 | Li-Y-Br-Cl | $1.3 \times 10^{-8}$ |

Comparative Examples 1 to 6

Preparation of Solid-Electrolyte Material

In Comparative examples 1 to 6, raw-material powders were weighed in an argon atmosphere having a dew point of less than or equal to −60° C.

In Comparative example 1, $YCl_3$ and LiCl were weighed such that the molar ratio between $YCl_3$ and LiCl was $YCl_3$:LiCl=1:3.

In Comparative example 2, $YCl_3$ and LiBr were weighed such that the molar ratio between $YCl_3$ and LiBr was $YCl_3$:LiBr=1:3.

In Comparative example 3, $YBr_3$ and LiBr were weighed such that the molar ratio between $YBr_3$ and LiBr was $YBr_3$:LiBr=1:3.

In Comparative example 4, $SmBr_3$ and LiI were weighed such that the molar ratio between $SmBr_3$ and LiI was $SmBr_3$:LiI=1:3.

In Comparative example 5, $GdBr_3$ and LiBr were weighed such that the molar ratio between $GdBr_3$ and LiBr was $GdBr_3$:LiBr=1:3.

In Comparative example 6, $GdBr_3$ and LiI were weighed such that the molar ratio between $GdBr_3$ and LiI was $GdBr_3$:LiI=1:3.

The above materials were pulverized and mixed with one another in an agate mortar. Then, the raw material powders were mixed and pulverized by mechanochemical milling to react with one another. Hereby, solid-electrolyte materials of Comparative examples 1 to 6 were prepared.

Evaluation of Ionic Conductivity

The conductivity measurement cells of Comparative examples 1 to 6 were prepared and subjected to the measurement of ionic conductivity as in Example 1.

Table 2 describes the structures and evaluation results of Comparative examples 1 to 6.

TABLE 2

| | Raw material 1 $MX_3$ | Raw material 2 LiZ | Molar mixing ratio Raw material 1:Raw material 2 | Synthesis method | Solid electrolyte Li-M-XZ | ionic conductivity (S/cm) |
|---|---|---|---|---|---|---|
| Comparative example 1 | $YCl_3$ | LiCl | 1:3 | Mechanochemical milling | Li-Y-Cl | $3.0 \times 10^{-4}$ |
| Comparative example 2 | $YCl_3$ | LiBr | 1:3 | | Li-Y-Br-Cl | $1.0 \times 10^{-3}$ |
| Comparative example 3 | $YBr_3$ | LiBr | 1:3 | | Li-Y-Br | $3.0 \times 10^{-4}$ |
| Comparative example 4 | $SmBr_3$ | LiI | 1:3 | | Li-Sm-Br-I | $1.5 \times 10^{-3}$ |
| Comparative example 5 | $GdBr_3$ | LiBr | 1:3 | | Li-Gd-Br | $6.0 \times 10^{-4}$ |
| Comparative example 6 | $GdBr_3$ | LiI | 1:3 | | Li-Gd-Br-I | $1.1 \times 10^{-3}$ |

Discussions

The solid-electrolyte material prepared in Example 1 had a higher ionic conductivity than the solid-electrolyte materials prepared in Examples 9 and 10. It is considered that a high ionic conductivity was not achieved when heat-treatment was performed at 200° C. because this temperature is lower than the temperature at which a solid electrolyte having a high ionic conductivity can be produced. It is also considered that the intended solid electrolyte failed to be produced when heat-treatment was performed at 500° C. because $NH_4Cl$ was sublimated.

It was confirmed that conducting the heat-treatment step in two stages and setting the heat-treatment temperatures such that T1≤T2 was satisfied as for the solid-electrolyte material prepared in Example 2 enabled a further high ionic conductivity to be achieved.

It was confirmed that a high ionic conductivity was also achieved even when Sm or Gd was used as M or plural halogen species were used as X and Z as in Examples 3 to 8.

It was confirmed that ionic conductivity comparable to the ionic conductivities of the solid-electrolyte materials synthesized by the mechanochemical milling reactions in Comparative examples 1 to 6 was achieved in Examples 1 to 8.

The above results confirm that the solid-electrolyte material synthesized by the production method according to the present disclosure may have a high lithium ion conductivity. Moreover, the production method according to the present disclosure is an easy and simple method. Furthermore, this production method is industrially cost-effective. Since the production method according to the present disclosure enables such a solid-electrolyte material to be readily synthesized by a solid-phase reaction between inexpensive $M_2O_3$ and $NH_4X$ in an easy and simple manner, it may further reduce the cost.

The production method according to the present disclosure may be used as, for example, a method for producing a solid-electrolyte material. The solid-electrolyte material produced by the production method according to the present disclosure may be included in, for example, a solid-state lithium secondary battery.

What is claimed is:

1. A method for producing a halide, the method comprising steps of:
   weighing $M_2O_3$, $NH_4X$ and LiZ according to a desired molar ratio;
   mixing $M_2O_3$, $NH_4X$ and LiZ to form a mixed material, the mixed material being a mixture of $M_2O_3$, $NH_4X$, and LiZ, and
   heat-treating the mixed material in an inert gas atmosphere,
   wherein the M includes at least one element selected from the group consisting of Y, a lanthanoid, and Sc,
   wherein the X is at least one element selected from the group consisting of Cl, Br, I, and F, and
   wherein the Z is at least one element selected from the group consisting of Cl, Br, I, and F.

2. The method for producing a halide according to claim 1, wherein, in the step of heat-treating, the mixed material is heat-treated at a temperature of greater than or equal to 200° C. and less than or equal to 650° C.

3. The method for producing a halide according to claim 1, wherein, in the step of heat-treating, the mixed material is heat-treated for a time period of greater than or equal to 1 hour and less than or equal to 72 hours.

4. The method for producing a halide according to claim 1,
   wherein the step of heat-treating includes first heat-treating and second heat-treating conducted subsequent to the first heat-treating,
   wherein, in the step of first heat-treating, the mixed material is heat-treated at a first heat-treatment temperature T1,
   wherein, in the step of second heat-treating, the mixed material is heat-treated at a second heat-treatment temperature T2, and
   wherein T1≤T2 is satisfied.

5. The method for producing a halide according to claim 4,
   wherein the X includes Cl,
   wherein 200° C.≤T1≤330° C. is satisfied, and
   wherein 330° C.≤T2≤650° C. is satisfied.

6. The method for producing a halide according to claim 4,
   wherein the X includes Br,
   wherein 200° C.≤T1≤390° C. is satisfied, and
   wherein 390° C.≤T2≤650° C. is satisfied.

7. The method for producing a halide according to claim 4,
   wherein the X includes I,
   wherein 200° C.≤T1≤550° C. is satisfied, and
   wherein 550° C.≤T2≤650° C. is satisfied.

8. The method for producing a halide according to claim 4,
   wherein the X includes F,
   wherein 200° C.≤T1≤230° C. is satisfied, and
   wherein 230° C.≤T2≤650° C. is satisfied.

9. The method for producing a halide according to claim 4,
   wherein, in the step of first heat-treating, the mixed material is heat-treated for a first heat-treatment time P1,
   wherein, in the step of second heat-treating, the mixed material is heat-treated for a second heat-treatment time P2, and
   wherein P1>P2 is satisfied.

10. The method for producing a halide according to claim 9, wherein the first heat-treatment time P1 is greater than or equal to 1 hour and less than or equal to 72 hours.

11. The method for producing a halide according to claim 9, wherein the second heat-treatment time P2 is greater than or equal to 1 hour and less than or equal to 72 hours.

12. The method for producing a halide according to claim 1, wherein the M is at least one element selected from the group consisting of Y, Sm, and Gd.

13. The method for producing a halide according to claim 1,
   wherein the X is at least one element selected from the group consisting of Cl, Br, and I, and
   wherein the Z is at least one element selected from the group consisting of Cl, Br, and I.

14. The method for producing a halide according to claim 1, wherein the mixing $M_2O_3$, $NH_4X$, and LiZ includes pulverizing $M_2O_3$, $NH_4X$, and LiZ.

15. The method for producing a halide according to claim 1, wherein the mixing $M_2O_3$, $NH_4X$, and LiZ includes mixing powders of each of $M_2O_3$, $NH_4X$, and LiZ.

16. The method for producing a halide according to claim 1, wherein the mixture includes only $M_2O_3$, $NH_4X$, and LiZ.

17. The method for producing a halide according to claim 13, wherein X is different from Z.

18. A method for producing a halide, the method comprising steps of:
heat-treating a mixed material in an inert gas atmosphere, the mixed material being a mixture of $M_2O_3$, $NH_4X$, and LiZ,
wherein the M includes at least one element selected from the group consisting of Y, a lanthanoid, and Sc,
wherein the X includes F,
wherein the Z is at least one element selected from the group consisting of Cl, Br, I, and F,
wherein the step of heat-treating includes first heat-treating and second heat-treating conducted subsequent to the first heat-treating,
wherein, in the step of first heat-treating, the mixed material is heat-treated at a first heat-treatment temperature T1,
wherein, in the step of second heat-treating, the mixed material is heat-treated at a second heat-treatment temperature T2,
wherein $T1 \leq T2$ is satisfied,
wherein $200°C. \leq T1 \leq 230°C.$ is satisfied, and
wherein $230°C. \leq T2 \leq 650°C.$ is satisfied.

\* \* \* \* \*